United States Patent [19]

Umebayashi et al.

[11] Patent Number: 5,587,860

[45] Date of Patent: Dec. 24, 1996

[54] MAGNETIC DISC CARTRIDGE INCLUDING A MAGNETIC DISC HAVING A CLEANING SHEET COMPOSED OF A NON-THEROPLASTIC FIBER

[75] Inventors: Nobuhiro Umebayashi; Kunio Mizushima, both of Tsukuba; Akira Miyake, Osaka; Teruhisa Miyata, Otokuni-gun, all of Japan

[73] Assignee: Hitachi Maxell, Ltd., Osaka, Japan

[21] Appl. No.: 363,022

[22] Filed: Dec. 23, 1994

Related U.S. Application Data

[63] Continuation of Ser. No. 68,290, May 28, 1993, which is a continuation of Ser. No. 784,071, Oct. 30, 1991, which is a continuation of Ser. No. 378,826, Jul. 12, 1989.

[30] Foreign Application Priority Data

| Jul. 14, 1988 | [JP] | Japan | 63-173724 |
| Sep. 1, 1988 | [JP] | Japan | 63-219240 |
| Sep. 26, 1988 | [JP] | Japan | 63-240511 |

[51] Int. Cl.$^6$ .............................. G11B 23/03; B32B 5/16
[52] U.S. Cl. .................. 360/133; 360/135; 428/694 BU; 428/694 BN; 428/694 BP
[58] Field of Search .................... 360/133, 135; 428/323, 332, 213, 217, 694 BU, 694 BN, 694 BP

[56] References Cited

U.S. PATENT DOCUMENTS

| 4,223,361 | 9/1980 | Zaitsu et al. | 360/133 |
| 4,354,213 | 10/1982 | Martinelli | 360/133 |
| 4,383,001 | 5/1983 | Fujiki | 428/522 |
| 4,419,164 | 12/1983 | Martinelli | 156/244.11 |
| 4,455,345 | 6/1984 | Miyatuka et al. | 428/332 |
| 4,465,737 | 8/1984 | Miyatuka et al. | 428/339 |
| 4,624,892 | 11/1986 | Ishizaki et al. | 428/323 |
| 4,666,754 | 5/1987 | Arioka et al. | 428/141 |
| 4,671,993 | 6/1987 | Kodokura et al. | 428/323 |
| 4,701,372 | 10/1987 | Akiyama et al. | 428/323 |
| 4,709,816 | 12/1987 | Matsumoto et al. | 360/133 |
| 4,759,979 | 7/1988 | Kosha et al. | 428/323 |
| 4,778,714 | 10/1988 | Woolley et al. | 428/217 |
| 4,803,584 | 2/1989 | Doi et al. | 360/133 |
| 4,812,938 | 3/1989 | Rogers et al. | 360/133 |
| 4,841,926 | 3/1989 | Gulbrandsen | 360/133 |

(List continued on next page.)

FOREIGN PATENT DOCUMENTS

| 0194649 | 3/1986 | European Pat. Off. . |
| 0238068 | 3/1987 | European Pat. Off. . |
| 0243185 | 4/1987 | European Pat. Off. . |
| 0244868 | 5/1987 | European Pat. Off. . |
| 2287744 | 10/1975 | France . |
| 53-102727 | 9/1978 | Japan . |
| 54-124707 | 9/1979 | Japan . |
| 55-285602 | 2/1980 | Japan . |
| 57-7087 | 5/1982 | Japan . |
| 62-78717 | 4/1987 | Japan . |
| 2100048 | 12/1982 | United Kingdom . |

OTHER PUBLICATIONS

IBM Technical Disclosure Bulletin; vol. 25, #7B; Olson et al., Dec. 1982.

*Primary Examiner*—Jefferson Evans
*Attorney, Agent, or Firm*—Birch, Stewart, Kolasch & Birch, LLP

[57] ABSTRACT

A magnetic disc cartridge comprising a cartridge case, a magnetic disc housed rotatably in the cartridge case, and a liner, which serves as a cleaning sheet, secured on the inner surface of the cartridge case, characterized in that the magnetic disc has a magnetic layer containing a ferromagnetic metal powder, a reinforcing powder, whose content is defined in the range of from 5 to 40% by weight, and a fatty acid ester with a melting point of 0° C. or lower, and that at least the disc side surface layer of the cleaning sheet, which is brought into sliding contact directly with the magnetic layer, is almost entirely composed of rayon fiber, such that the magnetic disc cartridge of the present invention can provide a highly reliable magnetic disc cartridge having a magnetic disc which is excellent in durability and substantially error free.

12 Claims, 4 Drawing Sheets

U.S. PATENT DOCUMENTS

| | | | |
|---|---|---|---|
| 4,897,752 | 1/1990 | Doi et al. | 360/133 |
| 4,985,295 | 1/1991 | Ishihara et al. | 428/213 |
| 5,060,105 | 10/1991 | Howey | 360/133 |
| 5,122,919 | 6/1992 | Takamae et al. | 360/133 |
| 5,179,487 | 1/1993 | Niitsuma et al. | 360/133 |
| 5,216,566 | 6/1993 | Obara et al. | 360/133 |
| 5,317,467 | 5/1994 | Kato et al. | 360/133 |

MAGNETIC DISC CARTRIDGE INCLUDING A MAGNETIC DISC HAVING A CLEANING SHEET COMPOSED OF A NON-THEROPLASTIC FIBER

This application is a continuation of Ser. No. 08/068,290 filed May 28, 1993, which is a continuation of Ser. No. 07/784,071 filed Oct. 30, 1991, which is a continuation of Ser. No. 07/378,826 filed Jul. 12, 1989.

BACKGROUND OF THE INVENTION

This invention relates to a magnetic disc cartridge having a magnetic disc housed rotatably in a cartridge case molded from a hard synthetic resin or in a flexible cartridge case. More specifically the invention relates to a cleaning sheet which makes sliding contact with the magnetic layer of the magnetic disc and provides for a use in the magnetic disc cartridge.

DESCRIPTION OF THE PRIOR ART

A magnetic disc cartridge consists mainly of a cartridge case having an opening for a magnetic head and an opening for a disc drive means, a flexible magnetic disc housed rotatably in the cartridge case, and a cleaning sheet or liner secured to the inside of the cartridge case.

In the prior art, a cleaning sheet of a magnetic disc cartridge has been composed of a non-woven fabric of a thermoplastic fiber, such as polyethylene terephthalate fiber or acrylic fiber, fixed to the inside of the cartridge case by means of, for instance, ultrasonic welding or an adhesive.

Recently, in the magnetic disc art, use is made of a magnetic layer containing powder of a ferromagnetic metal such as iron, cobalt, cobalt-nickel, cobalt-phosphorus or the like for enabling high-density recording. Such magnetic metal powders, however, are low in hardness as compared with magnetic powders of metal oxides, such as $\gamma$-$Fe_2O_3$, so that the magnetic layer comprising the magnetic metal powder is vulnerable to wear when in sliding contact with a magnetic head. For lessening such a tendency, attempts have been made to mix a reinforcing powder, such as aluminum oxide powder, in such a magnetic layer to increase its hardness.

Since thermoplastic fibers are used for the cleaning sheet and a hard reinforcing powder is contained in the magnetic layer as mentioned above, the thermoplastic fibers constituting the cleaning sheet are softened and worn by frictional heat in the course of long-term sliding contact of the cleaning sheet with the rotating magnetic disc, and the wear dust produced deposits on the magnetic head via the magnetic disc to cause errors in the recording and reproducing operations.

When the magnetic disc cartridge is in use, the magnetic disc housed therein is rotated at high speed in sliding contact with the magnetic head under a high pad pressure to perform recording or reproduction. Therefore, the magnetic layer of the magnetic disc or the liner made of the non-woven fabric secured to the inner surface of the cartridge case tends to be worn, and wear dust of the magnetic layer or liner deposits on the magnetic disc surface or magnetic head to cause error. Recently, there is seen a tendency to increase the capacity of a magnetic disc cartridge with the concomitant narrowing of the track width and an increase of the maximum line recording density, and this has brought about the problem that even very fine wear dust of the magnetic layer or liner, which wouldn't cause an error in the prior art devices, is now likely to induce an error when it deposits on the magnetic disc surface.

Magnetic disc cartridges also have a tendency to be smaller in size in spite of an increase in capacity. Accordingly, the magnetic disc cartridge drive is being made smaller in size, with the drive motor used therefor being switched into a low power consumption and low torque type, so that the magnetic head tends to stick to the magnetic layer or rotate unevenly unless the coefficient of friction of the magnetic layer is sufficiently reduced.

As a measure for minimizing the possibility of inducing errors and for improving durability and reliability, attempts have been made to mix a lubricant in the magnetic layer. For instance, it is proposed to mix a higher fatty acid, higher fatty acid ester, liquid paraffin, squalane, fluorine type lubricant or silicone type lubricant in the magnetic layer (Japanese Patent Application Kokai (Laid-Open) Nos. 70807/80, 124707/79 and 28560/80).

SUMMARY OF THE INVENTION

An object of this invention is to eliminate the defects of the prior art such as mentioned above and to provide a magnetic disc cartridge having excellent durability minimizing risk of error in the operation.

A further object of the present invention is to solve the problem wherein a small-sized, large-capacity magnetic disc cartridge, sufficient durability and reliability won't be obtained even when mixing a lubricant, such as mentioned above, in the magnetic layer, especially under a low-temperature environment, when the lubricant is poor in fluidity and becomes viscous, so that fine wear dust of the magnetic layer or liner produced as a result of the sliding motion of the magnetic disc tends to adhere to the magnetic disc surface or magnetic head to cause errors.

The term "magnetic disc" used in the present specification refers to hard and flexible (floppy) discs, and the term "cartridge" itself is used to represent hard and soft housing cases (jacket). When the term "magnetic disc cartridge" is used in this specification, it means cartridge-loaded magnetic disc products, which include jacketed floppy disc products (floppy disc jackets). Also, the term "cleaning sheet" means a liner on the inner surface of the cartridge case, which has a function to clean the magnetic disc.

BRIEF DESCRIPTION OF THE DRAWINGS

All of the drawings associated herewith illustrate a magnetic disc cartridge according to an embodiment of this invention, in which.

DETAILED DESCRIPTION OF THE DRAWINGS

In order to realize the objects of the present invention, there is provided a magnetic disc cartridge comprising a cartridge case such as one molded from a hard synthetic resin or made of a flexible sheet material, a flexible magnetic disc housed rotatably in the cartridge case, and a cleaning sheet secured on the inner surface of the cartridge case.

A feature of the present invention is that the magnetic disc has a magnetic layer containing powder of a ferromagnetic metal, such as iron or barium ferrite powder, and a reinforcing powder, such as aluminum oxide powder, whose content is defined to be in the range of from 5 to 40% by weight, and that at least the disc side surface layer of the cleaning sheet, which is brought into sliding contact directly with the magnetic layer, is almost entirely composed of a non-thermoplastic fiber, such as rayon fiber.

Another feature of the present invention is that a fatty acid ester with a melting point of 0° C. or below is contained in the magnetic layer of the magnetic disc housed rotatably in the magnetic disc cartridge, thereby to realize a marked improvement of wear resistance of the magnetic layer in a small-sized, large-capacity magnetic disc cartridge with a maximum linear recording density of more than 35 kfci (kilo flux change per inch) and a track density of more than 150 TPI (track per inch), while preventing generation of wear dust from the magnetic layer or liner to inhibit the occurrence of error even under a low-temperature environment. The present invention also makes it possible to prevent sticking of the magnetic head or non-uniformity of rotation in the case of using a miniaturized magnetic disc cartridge drive to realize improved durability and reliability under all possible practical use environments. Further, in the present invention, a non-woven fabric formed mainly from rayon fiber is used as liner on the inner surface of the jacket to substantially eliminate the risk of inducing error by wear dust of the liner to thereby attain a further improvement of durability and reliability of a small-sized, large-capacity magnetic disc cartridge.

DESCRIPTION OF PREFERRED EMBODIMENTS

The cartridge case and magnetic disc in accordance with this invention will be described below with reference to the accompanying drawings.

For making the cartridge case according to this invention, a thermoplastic synthetic resin such as ABS resin, polyacetal resin, polystyrene resin or the like is used and such resin is injection molded into a desired form of cartridge case.

The magnetic disc set in the cartridge case comprises, for example, a polyester or polyimide film coated on its one side or both sides with a magnetic layer and has a moderate degree of flexibility.

Referring to FIGS. 1 to 6, there are shown schematic drawings illustrating a magnetic disc cartridge according to an embodiment of the present invention.

Figure 1:
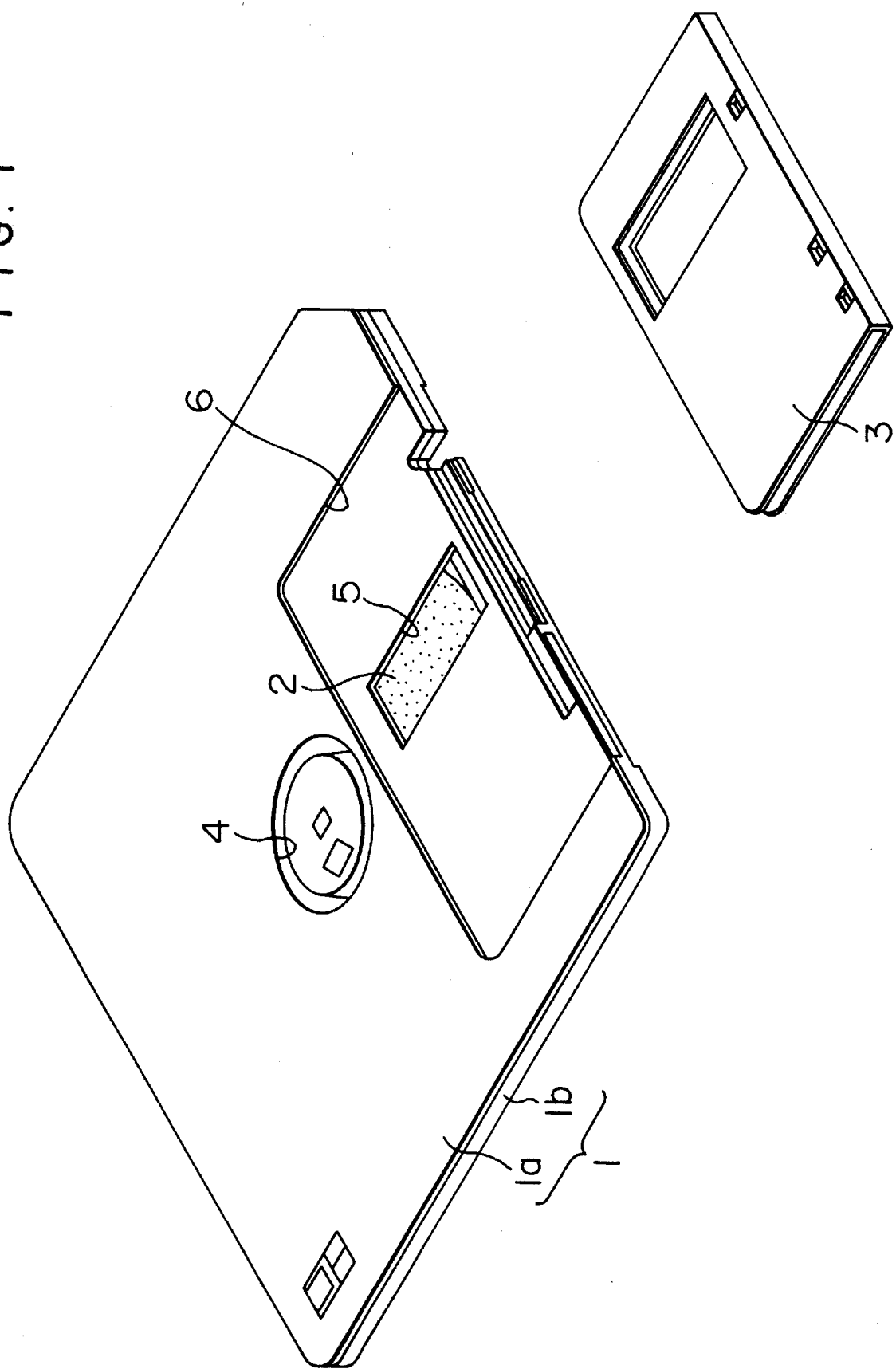
FIG. 1 is an exploded perspective view of the magnetic disc cartridge.
Figure 2:
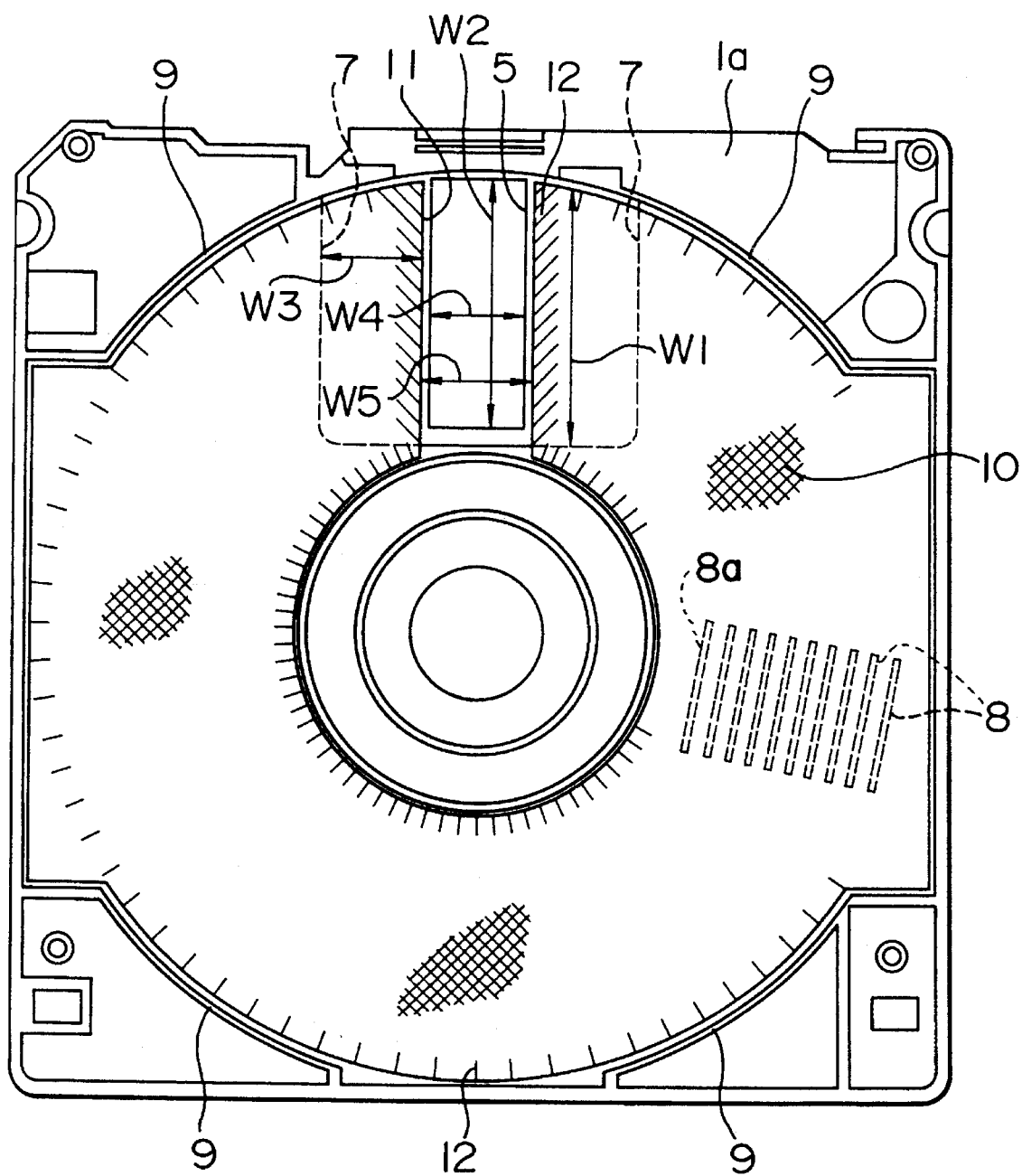
FIG. 2 is a bottom view of the cartridge showing a cleaning sheet secured to an upper case member.
Figure 3:
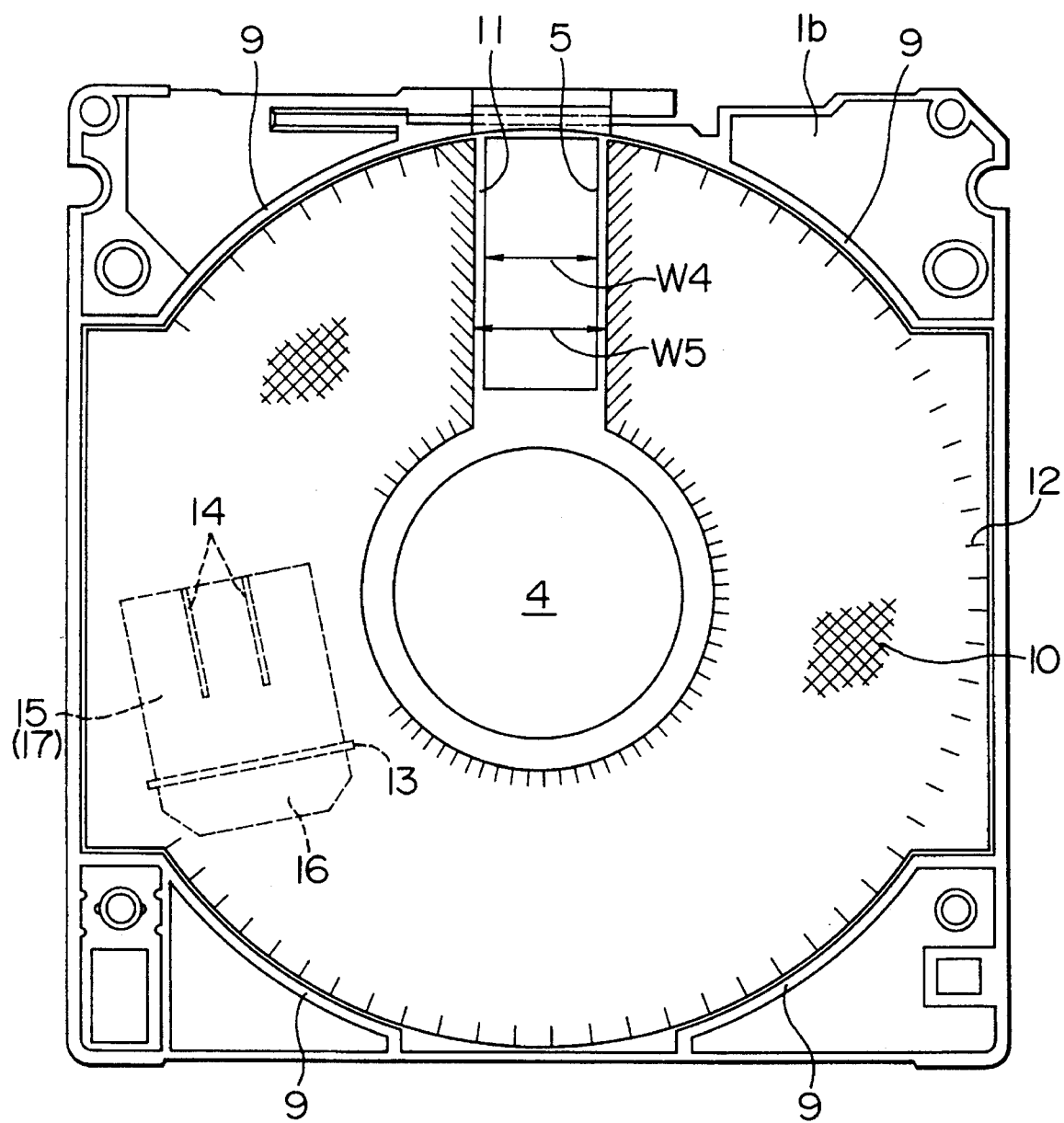
FIG. 3 is a plan view of the cartridge showing a cleaning sheet secured to a lower case member.
Figure 6:
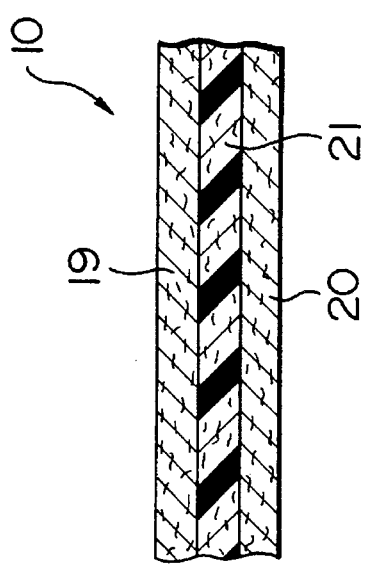
FIG. 6 is an enlarged sectional view of the cleaning sheet.
Figure 4:
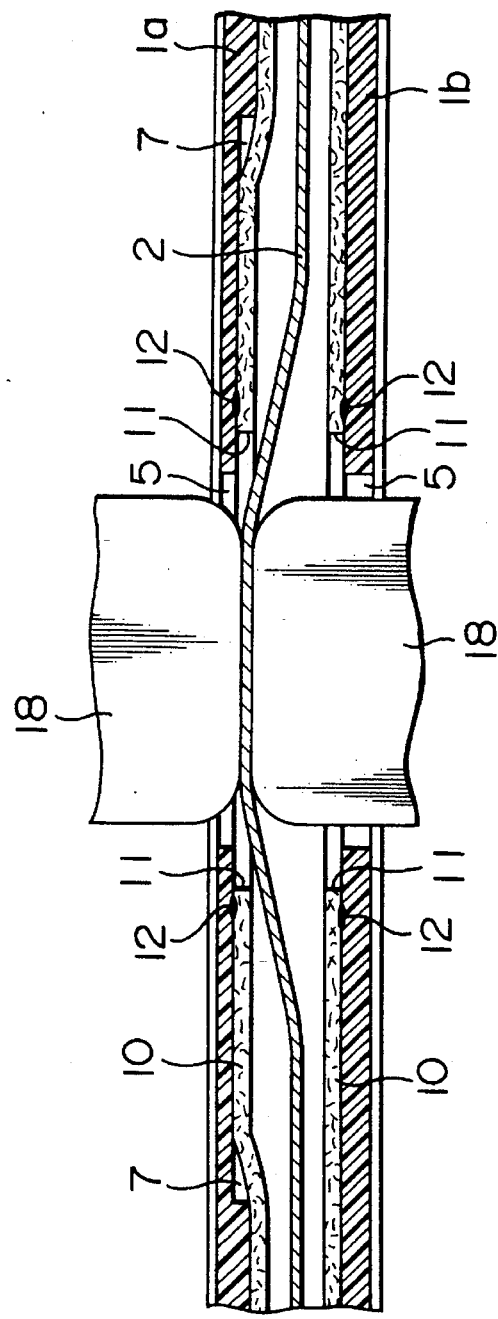
FIG. 4 is an enlarged sectional view of the portion around the magnetic head inlet, in a mode of use of the magnetic disc cartridge.
Figure 5:
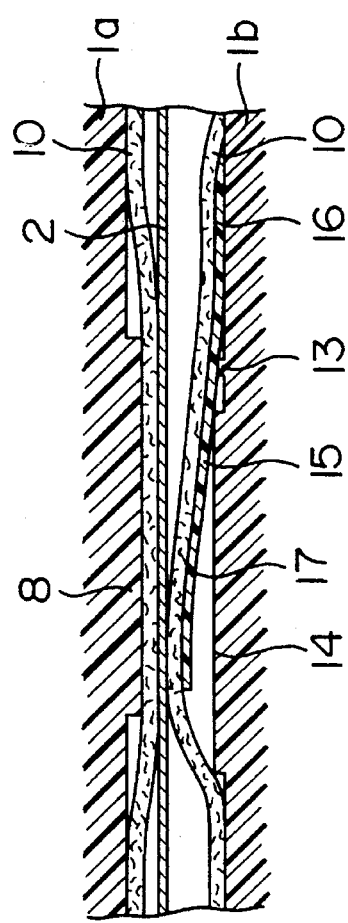
FIG. 5 is an enlarged sectional view of an elastic member and its surroundings in the said magnetic disc cartridge.

FIG. 1 is an exploded perspective view of the disc cartridge, and FIG. 2 is a bottom view thereof, showing the manner in which a cleaning sheet is secured to an upper case. FIG. 3 is a plan view of the cartridge, showing the state in which a cleaning sheet is secured to a lower case. FIG. 4 is an enlarged sectional view showing the portion around the magnetic head insertion opening, showing a mode of use of the magnetic disc cartridge, and FIG. 5 is an enlarged sectional view of the portion in the vicinity of an elastic member of the disc cartridge. FIG. 6 is an enlarged sectional view of a cleaning sheet.

The magnetic disc cartridge in accordance with this invention consists essentially of a cartridge case 1, a magnetic disc 2 housed rotatably therein, and a shutter 3 supported slidably in said cartridge case 1.

Cartridge case 1 consists of an upper case member 1a and a lower case member 1b. Both case members are injection molded from a hard synthetic resin, such as ABS resin.

Substantially centrally of the lower case member 1b is formed an opening 4 for inserting a drive shaft, and an oblong head inserting opening 5 is also formed near the opening 4. The head insertion opening 5 is also provided in the upper case member 1a. Near the front of the upper and lower case members 1a and 1b are provided with recesses 6 designed to define the range of slidable movement of the shutter 3, and the magnetic head inserting opening 5 is formed midway between the recesses 6, as shown in FIG. 1.

On the inside of the upper case member 1a and on both sides of the magnetic head insertion opening 5 are formed spot facing recesses 7,7 as shown in FIG. 2. The longitudinal width W1 of the recesses 7 is almost equal to the longitudinal width W2 of the magnetic head insertion opening 5, and the transverse width W3 of the recesses 7 is defined to be not less than 0.3 times, preferably 0.5 to 1.5 times, the width W4 in the direction orthogonal to the longitudinal direction of the magnetic head insertion opening 5.

A plurality of protrusions 8 extending in straight lines are provided on the upstream side, relative to the direction of disc rotation, of the magnetic head insertion opening 5 in the upper case member 1a. The two protrusions 8a positioned on both sides of the line of protrusions 8 are slightly higher than the other protrusions.

On the inside of the upper case member 1a are provided arcuate ribs 9 designed to define the position for housing the magnetic disc 2. A part of rib 9 passes an end of the corresponding one of the recesses 7 so that the ribs 9 can serve as a reinforcement of the surrounding of the recesses 7.

On the inside of the ribs 9 is fitted a substantially C-shaped cleaning sheet 10. In this cleaning sheet 10 is formed an opening 11 in alignment with the magnetic head insertion opening 5. The transverse width W5 of the opening 11 is slightly larger than the transverse width W4 of the magnetic head insertion opening 5. Cleaning sheet 10 is placed on the inner surface of the upper case member 1a so that the recesses 7 and protrusions 8 are covered, too. The periphery of the cleaning sheet 10 is fixed to the upper case member 1a by ultrasonic welding. Ample spacing of each recess 7 in the upper case 1a makes it possible to perform ultrasonic welding to the edge of opening 11 of cleaning sheet 10 in the recess 7.

A support rib 13 and an adherence-preventing rib 14 are provided at a position on the inside of lower case 1b and substantially opposing the protrusions 8 on upper case 1a, as shown in FIGS. 3 and 5. There is also provided an elastic member 15 formed by bending a plastic sheet, and as shown in FIGS. 3 and 5, the proximal portion 16 of the elastic member 15 is secured by suitable means such as bonding or heat fusion to a part on the inside of the lower case 1b and near the support rib 13. The free end 17 of the elastic member 15 is held in a slant state by the support strip 13.

Regulating ribs 9 are also provided on the inner surface of lower case 1b, and cleaning sheet 10 is disposed inside of the ribs. In the cleaning sheet 10 is formed an opening 11 at a position in alignment with the magnetic head insertion opening 5. The transverse width W5 of the opening 11 is slightly larger than the transverse width W4 of the magnetic head insertion opening 5. Elastic member is covered by the cleaning sheet 10 as it is placed on the inside of the lower case 1b, as shown in FIG. 3, and the periphery of the cleaning sheet 10 is secured to the lower case 1b by ultrasonic welding 12. No such ultrasonic welding is applied in the neighborhood of the elastic member 15.

When a magnetic disc cartridge is assembled by combining the upper and lower case members 1a and 1b, cleaning sheet 10 is partly raised up from the lower case member 1b by elastic member 15, as shown in FIG. 5, and the raised-up sheet is slightly pushed up by protrusions 8 provided on the upper case member 1a, so that the magnetic disc 2 is elastically held between the upper and lower cleaning sheets 10, 10. As magnetic disc 2 rotates, its surface is cleaned by the cleaning sheets 10.

FIG. 4 illustrates a mode of use of the magnetic disc cartridge. In the drawing, numeral 18 denotes a magnetic head.

The cleaning sheet 10 has a three-layer structure, as shown in FIG. 6. It consists of a non-woven fabric layer 19 opposing, magnetic disc 2, a non-woven fabric layer 20 opposing the cartridge case 1 and an intermediate non-woven fabric layer 21 joining the disc side non-woven fabric layer 19 and case side non-woven fabric layer 20.

The disc side non-woven fabric layer 19 and case side non-woven fabric layer 20 are both composed of rayon fiber alone, and their front and ear sides are indistinguishable. Examples of rayon fiber usable here are viscose rayon, cupro-ammonium rayon and acetate rayon. The rayon fiber (staple) used in this invention has a tensile strength of about 2.5 to 3.1 g/D, a rate of elongation of about 16 to 22%, a stretch modulus (at 3% elongation) of about 55 to 80% and a specific gravity of about 1.50 to 1.52.

The intermediate non-woven fabric layer 21 is composed of a mixture of rayon fiber and polyamide fiber. The rayon to polyamide fiber mixing ratio is properly selected from the range of about 1:9 to 9:1, preferably 3:7 to 7:3.

Polyamide fiber used in this invention is the one made by using a polycondensate of adipic acid and hexamethylenediamine as the starting monomer. Such a polyamide fiber should have a tensile strength of about 4.5 to 7.5, a rate of elongation of about 25 to 60%, a stretch modulus (at 3% elongation) of about 95 to 100% and a specific gravity of about 1.14.

Cleaning sheet 10 may be composed of rayon fiber alone, but when an intermediate layer 21 of a non-woven fabric containing thermoplastic fibers is provided between the disc side and case side non-woven fabric layers 19 and 20, as in the described embodiment of this invention, the sheet can be fusion bonded very favorably to the cartridge case 1.

Beside the mixture of rayon and polyamide fibers, various types of thermoplastic fibers such as polyethylene terephthalate, polyethylene, polypropylene, polystyrene, polyvinyl chloride and acrylic resin can be favorably used for forming the intermediate non-woven fabric layer 21. It is especially preferred to compose the intermediate non-woven fabric layer 21 from a fiber mixture containing rayon fiber in view of good affinity for both side layers 19 and 20 in which rayon fiber is used.

The basis weight of the cleaning sheet 10 is not specifically defined in this invention, but usually it is preferably in the range of about 20 to 50 g/m$^2$. The term "basis weight" used herein is the average of the measurements of weight of 5 samples with a size of 50×50 cm.

The thickness of the cleaning sheet 10 is preferably in the range of from 150 to 300 μm. Typical properties of the cleaning sheet 10 according to an embodiment of this invention are shown below in Table 1.

TABLE 1

| | |
|---|---|
| Base weight (g/m$^3$) | 43 |
| Thickness (μm) | 220 |
| Tensile strength (kg/5 cm) | |
| Longitudinal | 5.50 |
| Transverse | 1.10 |
| Charge attenuation time (sec) (at 20° C. and 65% RH) | 0.6 |
| Electrical resistance on surface (Ω) | 9 × 10$^{10}$ |
| Coeffiecient of friction against magnetic disc | 0.3 |

Cleaning sheet 10 is composed of a three-layer structure as described above, but when a magnetic disc cartridge is actually assembled by using such a cleaning sheet, there are occasions where not all of the fibers which make sliding contact with the magnetic disc 2 are rayon fibers, and a very small portion of thermoplastic fibers (polyamide fibers) in the intermediate layer 21 may come out on the surface side of the cleaning sheet 10 as a result of their entanglement and contact with the magnetic disc 2. Even in such a case, however, the ratio of thermoplastic fibers which make sliding contact with the magnetic disc 2 is less than 10%, and substantially the fibers contacted with the magnetic disc 2 can be regarded as almost entirely rayon fibers.

Now, the composition of the magnetic layer is described.

As ferromagnetic metal powder there can be used, for instance, powder of iron, cobalt, cobalt-nickel, cobalt-phosphorus and the like. Iron powder is used in the Examples of the invention described later. The properties of iron powder used in the Examples are as shown in Table 2 below.

TABLE 2

| | |
|---|---|
| Hc (Oe) | 1,650 |
| σs (emu/g) | 130 |
| BET surface area (m$^2$/g) | 44.8 |
| Average particle diameter (μm) | 0.25 |

Examples of reinforcing powder usable in this invention has more than 6 of Mohs' hardness and include powder of aluminum oxide, chromium, silicon carbide, silicon nitride and the like. In the Examples of this invention shown below, pulverized aluminum oxide was used as reinforcing powder. The particle size of the reinforcing powder is 0.1 to 1.0 μm, preferably 0.4 to 0.5 μm.

A preferred example of composition of the magnetic layer is shown in Table 3 below.

TABLE 3

| Composition | Wt part | Wt % |
|---|---|---|
| Magnetic metal (iron) powder | 100 | 63.9 |
| Vinyl chloride resin | 12 | 7.7 |
| Urethane resin | 7 | 4.5 |
| Crosslinking agent | 5 | 3.1 |
| Aluminum oxide (particle size: 0.4–0.5 μm) | 20 | 12.8 |
| Carbon black | 2 | 1.3 |
| Oleyl oleate | 9 | 5.8 |
| Butyl cellulose stearate | 1 | 0.6 |
| Zinc stearate | 0.5 | 0.3 |

The magnetic properties of the magnetic disc are as shown in Table 4 below.

TABLE 4

| Hc (Oe) | 1,500 |
|---|---|
| Br (G) | 1,500 |
| Bm (G) | 2,500 |

The results of examination of the relation between the content of the reinforcing powder (aluminum oxide, particle size: 0.4–0.5 μm) in the magnetic layer and cleaning sheet material are shown in Table 5 below.

TABLE 5

| Specimen No. | Component fiber | Content (Wt %) | Accelerated durability (hr) | Error |
|---|---|---|---|---|
| Comp. Example 1 | Rayon | 1 | <10 | None |
| Comp. Example 2 | " | 3 | 11 | " |
| Example 1 | " | 5 | 24 | " |
| Example 2 | " | 10 | 33 | " |
| Example 3 | " | 15 | 37 | " |
| Example 4 | " | 20 | 41 | " |
| Example 5 | " | 25 | 45 | " |
| Example 6 | " | 30 | >48 | " |
| Example 7 | " | 40 | >48 | " |
| Comp. Example 3 | PET | 1 | <10 | " |
| Comp. Example 4 | " | 3 | 10 | " |
| Comp. Example 5 | " | 5 | 21 | Caused |
| Comp. Example 6 | " | 10 | 30 | " |
| Comp. Example 7 | " | 15 | 36 | " |
| Comp. Example 8 | " | 20 | 40 | " |
| Comp. Example 9 | " | 25 | 43 | " |
| Comp. Example 10 | " | 30 | >48 | " |
| Comp. Example 11 | " | 40 | >48 | " |
| Comp. Example 12 | Mixture 1 | 20 | 42 | " |
| Comp. Example 13 | Mixture 2 | " | 39 | " |
| Comp. Example 14 | Mixture 3 | " | 40 | " |

"Component fiber" in the above table is the fiber composing the surface layer of the cleaning sheet which makes sliding contact with the magnetic disc. "PET" represents polyethylene terephthalate. "Mixture 1" is a mixture of rayon (50%) and polyethylene terephthalate (50%), "Mixture 2" is a mixture of rayon (50%) and acryl (50%), and "Mixture 3" is a mixture of rayon (50%) and polyamide (50%). "Accelerated durability" is the durability tested under the conditions of head load=40 g and peripheral speed=30 m/sec. In the column of "Error", there is shown whether no error occurred or an error was caused in 24-hour seeking.

As seen from Table 5, when the content of reinforcing powder (aluminum oxide) in the magnetic layer is low, such as 1 to 3% by weight, the magnetic disc is unsatisfactory in durability due to use of relatively soft magnetic metal powder. However, magnetic disc durability is markedly improved when the content of reinforcing powder in the magnetic layer is higher than 5% by weight, especially when it is higher than 10% by weight.

It is to be noted that an increase of content of reinforcing powder naturally leads to a corresponding reduction of other components such as magnetic metal powder and binder, even to such an extent that the desired properties will not be obtained. Therefore, it is necessary to limit the content of reinforcing powder to 40% by weight at most. The preferred range of reinforcing powder content is 10 to 30% by weight.

It is possible to improve durability of the magnetic disc by defining the content of reinforcing powder within the range of 5 to 40% by weight. However, when polyethylene terephthalate fiber alone is used (Comparative Examples 5–11) or when thermoplastic fiber is contained in the component fibers of cleaning sheet, as in the case of rayon/polyethylene terephthalate mixture (Comparative Example 12), rayon/acryl mixture (Comparative Example 13) and rayon/polyamide mixture (Comparative Example 14), such thermoplastic fiber is worn by heat of friction with the magnetic disc and the wear dust produced becomes a cause of error.

On the other hand, in the case of Examples 1 to 7 of this invention, the magnetic disc is excellent in durability and no error occurs. It has been experimentally confirmed that the same effect can be obtained when using other reinforcing powder.

Now, the relation between the surface roughness of magnetic disc and wear of the cleaning sheet is discussed. In order to minimize wear of the cleaning sheet, it is necessary to take into account surface roughness of the magnetic disc. When surface roughness of the magnetic disc is relatively large, such as 0.020–0.025 μm as in the conventional discs, cleaning sheet is naturally prone to wear.

It was found, however, that wear of the cleaning sheet could be minimized for a long time by reducing surface roughness Ra of magnetic disc to less than 0.01 μm, preferably less than 0.005 μm.

In the present invention, surface roughness of the magnetic layer was measured by Tayler-Habon Co.'s surface roughness tester under the following conditions: stylus diameter=2 μm, feeler load=25 mg, cut-off=0.08 mm, scanning speed=0.03 mm/sec. It is possible to maintain surface roughness of the magnetic layer to a desired level by properly changing the surface treating conditions (temperature, pressure and number of calender rolls in calendering apparatus).

In case a binder comprising urethane resin is contained in the magnetic layer as shown in Table 3, even when wear dust is produced from cellulose fiber such as rayon fiber, such wear dust scarcely deposits on the magnetic disc because of no affinity for such wear dust, thus minimizing the risk of causing error.

While rayon fiber was used as non-thermoplastic resin in the above-described embodiment of the invention, the similar effect can be obtained as well by using other cellulose fibers such as cotton fiber.

Selection and use of lubricant in the magnetic layer of magnetic disc in magnetic disc cartridge according to this invention is also an important feature of the present invention. It will be described below by showing examples.

Fatty acid esters having a melting point below 0° C., especially 2-heptylundecyl oleate obtainable from an ester reaction of 2-heptylundecyl alcohol and oleic acid are preferably used as lubricant to be contained in magnetic layer of magnetic disc set in cartridge case.

As these types of fatty acid esters have a branched structure and unsaturated bonds at the same time, they are low in melting point, assuming a liquid state at 0° C., and also low in viscosity, show good fluidity at low temperatures and have excellent lubricating performance. When such type of fatty acid ester is contained in magnetic layer of magnetic disc, the co-efficient of friction of the magnetic layer surface is significantly reduced owing to the excellent lubricating performance, resulting in a marked improvement of wear resistance of the magnetic layer or the liner secured to the inner surface of the cartridge case. Accordingly, generation of wear dust of magnetic layer or liner is arrested or minimized. Further, since this type of fatty acid esters assume a liquid state at 0° C., are low in viscosity and show good fluidity at low temperatures, fine wear dust of magnetic layer or liner little deposits on the magnetic disc surface or magnetic head even under low-temperature environments to markedly lessen the possibility of causing error. Moreover, because of low coefficient of friction of the magnetic layer surface, there takes place no sticking of magnetic head to magnetic layer nor non-uniform rotation of magnetic head even if the disc drive motor is a low power consumption and low torque type. This leads to a remarkable enhancement of reliability of magnetic disc.

Especially when it is desired to reduce only the coefficient of friction of magnetic layer, it is required to give particular consideration to molecular structure of fatty acid ester.

In case of employing an ester of branched alcohol and fatty acid, it is possible to reduce the coefficient of friction without regard to melting point. It is especially effective to use a fatty acid ester represented by the following formula (1):

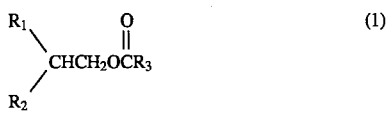

wherein $R_1$ and $R_2$ represent independently a straight-chain or branched saturated alkyl group having 1 to 15 carbon atoms, but the sum of the carbon numbers of $R_1$ and $R_2$ is 16, and $R_3$ represents a straight-chain or branched saturated or unsaturated alkyl group having 17 carbon atoms.

Typical examples of fatty acid esters are 2-ethylhexadecyl stearate, 2-hexyldodecyl stearate, 2-octyldecyl stearate, 2-heptylundecyl isostearate, 2-ethylhexadecyl oleate, 2-hexadodecyl oleate, and 2-octyldecyl oleate. Among them, the esters of the formula (1) wherein $R_1$ is a straight-chain or branched alkyl group having 7 carbon atoms and $R_2$ is a straight-chain or branched alkyl group having 9 carbon atoms are preferred, the examples of such esters being 2-heptylundecyl stearate and 2-heptylundecyl oleate.

Needless to say, in the fatty acid esters having the molecular structure, those having a melting point below 0° C. are excellent synthetically. In this sense, 2-heptylundecyl oleate is the most preferred as it has a large molecular weight and shows high surface tension, hence excellent durability of the product using it.

Such fatty acid esters with melting point below 0° C. may be used singly, but they may be used with a known lubricant such as higher fatty acids, higher fatty acid esters, liquid paraffin, squalane, fluorine type lubricants, silicone type lubricants and the like. In this case, in order to maximize the desired effect, it is desirable to add the lubricant at such a rate that the total amount thereof will be less than 10% by weight of the amount of the fatty acid ester with melting point below 0° C.

Several methods are available for containing a fatty acid ester with melting point below 0° C. in the magnetic layer. For instance, the fatty acid ester is mixed and dispersed with a magnetic powder, binder resin or the like to prepare a magnetic coating material and this magnetic coating material is applied on a non-magnetic substrate and dried to form a magnetic layer, or said fatty acid ester is dissolved in a solvent such as toluene, n-hexane or the like and this solution is coated or sprayed on the surface of the already formed magnetic layer or this magnetic layer is immersed in the solution.

As a magnetic powder used for forming the magnetic layer in this invention, there can be employed various types of magnetic powder generally utilized for magnetic recording media, such as $\gamma$-$Fe_2O_3$ powder, $Fe_3O_4$ powder, Co-containing $\gamma$-$Fe_2O_3$ powder, Co-containing $Fe_3O_4$ powder, $CrO_2$, Fe powder, Co powder, Fe-Ni powder, barium ferrite powder, etc. As binder resin, one may use any of those generally employed for magnetic recording media, such as vinyl chloride-vinyl acetate polymer, cellulose resin, polyester resin, isocyanate compounds, radiation-cured resin and the like. As for organic solvent, it is possible to use any of those commonly employed for magnetic recording media, such as methyl isobutyl ketone, methyl ethyl ketone, cyclohexanone, benzene, toluene, xylene, ethyl acetate, tetrahydrofuran, dioxane and the like.

It is also possible to properly blend various types of commonly used additives such as dispersant, abrasive, antistatic agent, etc., in the magnetic coating material.

The liner bonded to the inside of cartridge case housing magnetic disc of this invention is preferably made of non-woven fabric which is mainly composed of rayon fiber. Such a liner is highly resistant to abrasion even when contacted slidingly with magnetic disc rotating at high speed and there is produced little wear dust from the liner. Thus, the possibility is minimized that the error be caused by the deposition of wear dust of liner on the disc surface or magnetic head, making it possible to obtain a magnetic disc cartridge having excellent durability and reliability.

The non-woven fabric used as liner in this invention may not necessarily be composed of rayon fiber alone. It is possible to mix other types of fiber such as nylon, polyester, etc., with rayon fiber, in which case the ratio of rayon fiber is preferably not less than 60% by weight based on the total weight of liner.

As described above, the magnetic disc cartridge according this invention, in which at least one fatty acid ester with melting point below 0° C. is contained in the magnetic layer of magnetic disc housed rotatably in cartridge case and a non-woven fabric mainly composed of rayon fiber is used as liner secured on the inside of the cartridge case, has excellent durability and reliability under all possible use conditions, and even when a small-sized and large-capacity magnetic disc having a maximum linear recording density of greater than 35 kfci and a track density of higher than 150 TPI is incorporated in said magnetic disc cartridge, there seldom occurs error, and also sticking of magnetic head or non-uniformity of rotation is prevented.

PREFERRED EMBODIMENTS

The present invention will be further described below with reference to the examples thereof.

EXAMPLE 8

100 parts by weight of magnetic powder of α-Fe (coercive force: 1,650, Oe; saturation magnetization: 135 emu/g; BET specific surface area: 45 m²/g), 14.1 parts by weight of vinyl chloride-vinyl acetate-vinyl alcohol copolymer, 8.5 parts by weight of polyurethane resin, 5.6 parts by weight of trifunctional isocyanate compound, 20 parts by weight of alumina (average particle diameter: 0.43 μm), 2 parts by weight of carbon black, 10 parts by weight of 2-heptylundecyl oleate, 150 parts by weight of cyclohexanone and 150 parts by weight of toluene were mixed and dispersed in a ball mill to prepare a magnetic coating material. This coating material was applied on both sides of a 75 μm thick polyester film and dried so that the dry coat thickness would become 2.5 μm, and the coated film was calendered to form a magnetic layer. This magnetic layer was hot cured at 80° C. for 16 hours, then punched into a disc shape and polished to obtain a magnetic disc.

The thus obtained magnetic disc was incorporated in a cartridge case lined with a Kendall Co.'s 149-246 non-woven fabric (made of 100% rayon at the side contacted with magnetic disc and a mixture of 80% rayon and 20% nylon at the side contacted with cartridge case) to produce a magnetic disc cartridge.

EXAMPLE 9

A magnetic disc was produced in the same way as Example 8 except that in the composition of magnetic coating material, magnetic powder of barium ferrite was used in place of magnetic powder of α-Fe in the same amount, and a magnetic disc cartridge was made according to Example 1 by using said magnetic disc.

EXAMPLE 10

A magnetic disc cartridge was produced in the same way as Example 8 except for use of a cartridge case lined with Mitsubishi Rayon's VA450D /non-woven fabric of 100% acrylic fiber) in place of the cartridge case lined with Kendall Co.'s 149-246.

EXAMPLE 11

A magnetic disc cartridge was produced in the same way as Example 8 except for use of a jacket lined with Kendall Co.'s 149-007 (100% polyester non-woven fabric) in place of the cartridge case lined with Kendall Co.'s 149-246.

EXAMPLE 12

A magnetic disc cartridge was produced in the same way as Example 8 except for use of cartridge case lined with Kendall Co.'s 149-188 (mixed non-woven fabric of 50% rayon and 50% polyester) in place of the cartridge case lined with Kendall Co.'s 149-246.

EXAMPLE 13

A magnetic disc cartridge was produced in the same way as Example 8 except for use of a cartridge case lined with Mitsubishi Rayon's VK450C (mixed non-woven fabric of 50% rayon and 50% acryl) in place of the cartridge case lined with Kendall Co.'s 149-246.

COMPARATIVE EXAMPLE 15

A magnetic disc was produced by using a magnetic coating material of the same composition as Example 8 except that oleyl oleate was used in place of 2-heptylundecyl oleate in the same amount, and by using said magnetic disc, a magnetic disc cartridge was produced according to Example 8.

COMPARATIVE EXAMPLE 16

A magnetic disc was produced with the same composition of magnetic coating material as used in Example 8 except that n-butyl stearate was used in place of 2-heptylundecyl oleate in the same amount, and a magnetic disc cartridge was produced according to Example 8 by using said magnetic disc.

COMPARATIVE EXAMPLE 17

A magnetic disc and a magnetic disc cartridge were produced in the same way as Example 8 except that in the composition of magnetic coating material, glycerin trioleate was used in place of 2-heptylundecyl oleate in the same amount.

COMPARATIVE EXAMPLE 18

A magnetic disc and a magnetic disc cartridge were produced in the same way as Example 8 except that in the composition of magnetic coating material, liquid paraffin was used in place of 2-heptylundecyl oleate in the same amount.

The probability of occurrence of error, durability and starting torque were examined for each of the magnetic disc cartridges obtained in the Examples and Comparative Examples. The probability of occurrence of error was determined by loading each magnetic disc cartridge with a magnetic disc drive with a recording capacity of 12.5 megabytes, maximum linear recording density of 35 kfci, track density of 406 TPI and disc speed of 360 r.p.m., and a magnetic disc drive with a recording capacity of 4 megabytes, maximum linear recording density of 35 kfci, track density of 135 TPI and disc speed of 300 r.p.m., recording and reproducing by using an amorphous magnetic head of sendust with gap length of 0.35 μm, and after confirming no dropout, conducting 2-hour seeking at 0° C. and 50° C. to determine the rate of occurrence of error. Durability was determined by loading each magnetic disc cartridge with a 3.5 inch magnetic disc drive, bringing the magnetic disc into sliding contact with magnetic head at 0° C. and 50° C., measuring the drop of reproducing output level due to wear of magnetic layer, and counting the number of times of run that lasted until the reproducing output was reduced to 70% of the initial output. Starting torque was determined by setting each magnetic disc cartridge in a measuring device made by remodelling a magnetic disc drive, and measuring the torque after one-hour run at 0° C. and 50° C.

The results are shown in Table 6.

TABLE 6

|  | Probability of occurrence of error | | | | Durability times of run, $\times 10{,}000$) | | Starting torque (g/cm) | |
| --- | --- | --- | --- | --- | --- | --- | --- | --- |
|  | 406TPI | | 135TPI | | | | | |
|  | 0° C. | 50° C. | 0° C. | 50° C. | 0° C. | 50° C. | 0° C. | 50° C. |
| Example 8 | $1/(5 \times 10^9)$ | $1/(1 \times 10^{10})$ | $1/(2 \times 10^{10})$ | $1/(4 \times 10^{10})$ | 1530 | 1250 | 60 | 52 |
| Example 9 | $1/(6 \times 10^9)$ | $1/(2 \times 10^{10})$ | $1/(2 \times 10^{10})$ | $1/(5 \times 10^{10})$ | 1600 | 1270 | 67 | 58 |
| Example 10 | $1/(1 \times 10^9)$ | $1/(4 \times 10^9)$ | $1/(3 \times 10^9)$ | $1/(8 \times 10^9)$ | 1320 | 1100 | 62 | 56 |
| Example 11 | $1/(1 \times 10^9)$ | $1/(4 \times 10^9)$ | $1/(2 \times 10^9)$ | $1/(7 \times 10^9)$ | 1250 | 1060 | 64 | 55 |
| Example 12 | $1/(2 \times 10^9)$ | $1/(6 \times 10^9)$ | $1/(4 \times 10^9)$ | $1/(1 \times 10^{10})$ | 1430 | 1220 | 61 | 54 |
| Example 13 | $1/(2 \times 10^9)$ | $1/(7 \times 10^9)$ | $1/(5 \times 10^9)$ | $1/(1 \times 10^{10})$ | 1460 | 1230 | 60 | 52 |
| Comp. Example 15 | $1/(5 \times 10^8)$ | $1/(3 \times 10^9)$ | $1/(9 \times 10^8)$ | $1/(6 \times 10^9)$ | 1240 | 1040 | 115 | 90 |
| Comp. Example 16 | $1/(2 \times 10^8)$ | $1/(7 \times 10^8)$ | $1/(6 \times 10^8)$ | $1/(2 \times 10^9)$ | 600 | 400 | 180 | 70 |
| Comp. Example 17 | $1/(4 \times 10^8)$ | $1/(2 \times 10^9)$ | $1/(7 \times 10^8)$ | $1/(4 \times 10^9)$ | 1050 | 1000 | 130 | 75 |
| Comp. Example 18 | $1/(2 \times 10^8)$ | $1/(6 \times 10^8)$ | $1/(8 \times 10^8)$ | $1/(4 \times 10^9)$ | 500 | 300 | 150 | 105 |

As seen from Table 6, the magnetic disc cartridges obtained in accordance with this invention are low in probability of occurrence of error especially at 0° C., high in durability at 0° C. and 50° C. and also small in starting torque at 0° C. and 50° C. These facts confirm that the magnetic disc cartridges obtained according to this invention are minimized in occurrence of error and show excellent durability and reliability under all possible use conditions.

Further examples of this invention where esters of various types of branched alcohols and fatty acids were contained in the magnetic layer for reducing the coefficient of friction of magnetic disc are described below.

EXAMPLES 14–20

By using the branched fatty acid esters shown in Table 7 as lubricant, there were prepared samples of magnetic coating material comprising the following composition:

| | |
| --- | --- |
| Magnetic powder of metallic iron (average particle diameter along major axis: 0.25 μm, average axial ratio: 8 SBET 50 m²/g, HC = 1,630 Oe, σs = 120) | 100 parts |
| Vinyl chloride-vinyl alcohol copolymer (VAGH, produced by UCC Inc.) | 12.5 parts |
| Polyurethane resin (HI-200, produced by Dai-Nippon Ink Co., Ltd.) | 7.5 parts |
| Polyisocyanate compound (COLONATE-L, produced by Nippon Polyurethane Co., Ltd.) | 5 parts |
| α-Al₂O₃ (ave. particle diameter: 0.4 μm) | 20 parts |
| Lubricant (shown in Table 1) | 10 parts |
| Cyclohexanone | 157 parts |
| Toluene | 157 parts |

Each sample of magnetic coating material was applied on both sides of a 75 μm thick polyester film so that the coating thickness after dried would become 2.5 μm, and then subjected to a calendering treatment to form a magnetic layer. This was then hot cured at 80° C. for 16 hours and the coated film was blanked into a disc shape to make a magnetic disc.

The coefficient of friction of each of the thus obtained magnetic discs was measured after one-hour running at 20° C. and 45° C. by using a measuring device made by remodeling a 3.5 inch magnetic disc cartridge drive. The results are shown in Table 7.

TABLE 7

| Example No. | Lubricant | Coefficient of friction | |
| --- | --- | --- | --- |
| | | 20° C. | 45° C. |
| 14 | 2-heptylundecyl stearate | 0.20 | 0.24 |
| 15 | 2-heptylundecyl oleate | 0.20 | 0.23 |
| 16 | 2-hexyldodecyl stearate | 0.21 | 0.24 |
| 17 | 2-hexyldodecyl oleate | 0.21 | 0.24 |
| 18 | Oleyl oleate | 0.25 | 0.27 |
| 19 | Butyl cellosolve oleate | 0.24 | 0.25 |
| 20 | Liquid paraffin | 0.28 | 0.30 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A magnetic disc cartridge for high density recording of 35 Kfci or more comprising in combination a cartridge case, a magnetic disc housed rotatably in said cartridge case, and a cleaning sheet of non-woven fabric secured on an inner surface of said cartridge case juxtapositioned relative to said magnetic disc, said magnetic disc having a linear recording density of 35 Kfci or more including a magnetic layer comprising a soft magnetic powder and a reinforcing powder dispersed in a binder resin, said soft magnetic powder being selected from at least one member of the group consisting of a ferromagnetic metal powder and a barium ferrite powder, said reinforcing powder having a particle size of from 0.1 to 1.0 μm and being present in said magnetic layer of said magnetic disc in an amount of from 5 to 40% by weight, wherein at least a disc side surface layer of said cleaning sheet, which is brought into direct sliding contact with said magnetic layer consists of a non-thermoplastic fiber.

2. A magnetic disc cartridge according to claim 1, wherein said reinforcing powder is aluminum oxide powder.

3. A magnetic disc cartridge according to claim 1, wherein said magnetic disc has a surface roughness (Ra) of not more than 0.01 μm.

4. A magnetic disc cartridge according to claim 1, wherein said at least one fatty acid ester is 2-heptylundecyl oleate.

5. A magnetic disc cartridge according to claim 1, wherein said magnetic disc has a track density of at least 150 TPI.

6. The magnetic disc cartridge according to claim 1, wherein said magnetic layer of said magnetic disc further includes at least one fatty acid ester lubricant having a melting point of 0° C. or lower.

7. The magnetic disc cartridge according to claim 1, wherein said non-thermoplastic fiber is rayon.

8. A magnetic disc cartridge according to claim 7, wherein said cleaning sheet of non-woven fabric consists of three layers, a surface layer and a backside layer each consisting of rayon fibers and an intermediate layer comprising a mixture of rayon fibers and thermoplastic fibers.

9. A magnetic disc cartridge according to claim 1, wherein said binder resin of said magnetic layer comprises urethane.

10. A magnetic disc cartridge according to claim 1, wherein said soft magnetic powder present in said magnetic layer is a ferromagnetic metal powder.

11. A magnetic disc cartridge according to claim 10, wherein said ferromagnetic metal powder is iron powder.

12. A magnetic disc cartridge according to claim 1, wherein said soft magnetic powder present in said magnetic layer is barium ferrite powder.

* * * * *